United States Patent [19]

Sekine et al.

[11] Patent Number: 5,679,095
[45] Date of Patent: Oct. 21, 1997

[54] SHIFT CONTROL APPARATUS FOR AUTOMATIC TRANSMISSION

[75] Inventors: Noboru Sekine, Kasukabe; Shuichi Fujimoto, Kawagoe; Kazumi Sato, Tokorozawa; Hisashi Kunii, Higashikurume; Yoshiyuki Ura, Niiza; Takamichi Shimada, Sakado, all of Japan

[73] Assignee: Honda Giken Kogyo Kabushiki Kaisha, Tokyo, Japan

[21] Appl. No.: 627,405

[22] Filed: Apr. 4, 1996

[30] Foreign Application Priority Data

Apr. 3, 1995 [JP] Japan ................. 7-101782

[51] Int. Cl.$^6$ .................. B60K 41/02; F16D 25/14
[52] U.S. Cl. .................. 477/116; 477/117
[58] Field of Search .................. 477/116, 117, 477/143, 154, 155, 156

[56] References Cited

U.S. PATENT DOCUMENTS

| | | | |
|---|---|---|---|
| 5,094,128 | 3/1992 | Kamada | 477/117 |
| 5,224,398 | 7/1993 | Sasaki | 477/116 X |
| 5,249,483 | 10/1993 | Iizuka | 477/117 |
| 5,400,670 | 3/1995 | Yamatani et al. | 477/117 X |

FOREIGN PATENT DOCUMENTS

| | | | |
|---|---|---|---|
| 63-280929 | 11/1988 | Japan . | |
| 4-140565 | 5/1992 | Japan | 477/117 |
| 5-280626 | 10/1993 | Japan | 477/117 |
| 6109130 | 4/1994 | Japan . | |

*Primary Examiner*—Khoi Q. Ta
*Attorney, Agent, or Firm*—Lyon & Lyon LLP

[57] ABSTRACT

An engagement-actuation control for a frictionally engaging element to establish a driving range in response to a shift command to shift from a neutral range to the driving range comprises a plurality of control stages including an invalid-stroke-clearing control. This invalid-stroke-clearing control is finished when invalid-stroke clearing is judged complete on the basis that the absolute value of the rate of rotational change of a turbine shaft is equal to or greater than a predetermined rate and that the difference between the rotational speed of an engine and the rotational speed of the turbine shaft is equal to or greater than a predetermined value.

23 Claims, 10 Drawing Sheets

SHIFT CONTROL APPARATUS FOR AUTOMATIC TRANSMISSION

FIELD OF THE INVENTION

The present invention relates generally to an automatic transmission (including a continuously variable transmission capable of preforming automatic speed change) for use in vehicles, and particularly to a shift control apparatus for controlling shift from a neutral range to a driving range (either to a forward range or to a reverse range). This shift control is referred to as "in-gear control".

BACKGROUND OF THE INVENTION

Automatic transmissions comprise a plurality of gear trains. Their speed ranges are selected among a plurality of power transmission paths which are composed of these gear trains by actuating such frictionally engaging elements as clutches and brakes through supply of hydraulic pressure. When a speed range shift is made, the power transmission paths switch to change the transmission gear ratio. If a shift is carried out suddenly, there arises a problem of shift shock. Therefore, various ideas have been contrived to adjust engagement of the frictionally engaging elements in order to carry out speed-range shifts smoothly without any shock.

This shift shock problem is especially noticeable if the shift lever is operated from the neutral range to the forward (or reverse) range to set the forward (or reverse) range (which is referred to as "in-gear shift"). The reason is that there is a little input torque but a large ratio of transmission torque change to engaging capacity change in the frictionally engaging element involved in the in-gear control, which shifts from the neutral range having no load to the forward (or reverse) range. Therefore, this frictionally engaging element requires a delicate engaging control.

Various ideas have been proposed for the in-gear control. For example, Japanese Laid-Open Patent Publication No. H6(1994)-109130 proposes a control apparatus which executes a first shift-control stage for executing a fast quick-fill by actuating the solenoid valve at a large duty cycle when a shift command to shift from the neutral range to the driving range is generated. Then, the control apparatus executes a second shift-control stage for reducing the pressure supplied to the clutch by actuating the solenoid valve at a predetermined duty-cycle reduction rate. Before completely engaging the clutch, it executes a third shift-control stage for minimizing the pressure by actuating the solenoid valve at a duty cycle determined on the basis of the rotational speed of the engine.

In the above mentioned fast quick-fill, a hydraulic chamber with a piston composing the frictionally engaging element is filled with oil so that the frictionally engaging element is cleared of its invalid stroke and comes into a preengagement condition (i.e., the piston is shifted to a position where the engagement can be immediately followed). The term "invalid stroke" means a piston stroke in the cylinder of an engaging element through which no engaging force is applied on the engaging element (such as clutches and brakes).

If this fast quick-fill is appropriately executed, the in-gear control can be smoothly carried out. However, if the fast quick-fill is followed by the next control stage before completing the invalid-stroke clearing, then it takes a relatively long time for the invalid stroke to be cleared. This condition presents a possibility of in-gear delay. On the other hand, if the fast quick-fill continues even though the invalid stroke has been cleared, then the frictionally engaging element will engage rapidly, presenting a possibility of in-gear shock.

Therefore, Japanese Laid-Open Patent Publication No. 63-280929 proposes an apparatus which judges the completion of the filling process when the rate of rotational change of the input shaft of the transmission (the turbine shaft of the torque convertor) increases to above a predetermined value.

However, the rotational speeds of the engine and the turbine of the torque convertor can not be always constant at the time of in-gear, but they are rather unstable. Such unstable rotation may lead the rate of rotational change of the turbine shaft to increase above the predetermined value temporarily. Because of this, there may be a problem of misjudgment on the completion of the filling process (or completion of the invalid-stroke clearing) if it is determined solely on the basis of the rate of rotational change of the turbine shaft (input shaft of the transmission). If in-gear control is carried out on the basis of such misjudgment then there is a possibility of in-gear delay or in-gear shock.

Automatic transmissions include not only the above described type which comprises gear trains but also a type which comprises a continuously variable speed mechanism. Since continuously-variable-type automatic transmissions also allow shifts to a forward range, neutral range, and reverse range in response to operation of the shift lever, the above mentioned same problem occurs when in-gear control is executed.

SUMMARY OF THE INVENTION

It is an object of the present invention to provide a shift control apparatus for an automatic transmission which is capable of accurately detecting completion of invalid-stroke clearing and of executing a smooth and quick in-gear control.

Another object Of the present invention is to provide a shift control apparatus for an automatic transmission which is capable of accurately detecting completion of invalid-stroke clearing without being affected by engine rotational change and of executing a smooth and quick in-gear control.

In order to achieve these objectives, the shift control apparatus of the present invention incorporates an engaging control for a frictionally engaging element to establish a driving range in response to a shift command to shift from a neutral range to the driving range. This engaging control comprises a plurality of control stages including an invalid-stroke-clearing control, which is finished upon completion of invalid-stroke clearing judged on the basis that the absolute value of the rate of rotational change of the turbine shaft is equal to or greater than a predetermined rate, and that the difference between the rotational speed of the engine and that of the turbine shaft is equal to or greater than a predetermined value.

In response to the shift command, load of the turbine shaft increases correspondingly to engaging actuation of the frictionally engaging element. Generally, while the rotational speed of the turbine shaft is small, the above mentioned difference (rotational slip of the torque convertor) increases. However, the engine rotational speed is not always stable since the in-gear control can be carried out, for example, while the accelerator pedal is footed or not footed, or while the pedal is being released. Therefore, the rate of rotational change of the turbine differs for each condition of the accelerator pedal.

Because of this, it is difficult to determine if the invalid-stroke clearing is complete or not if the judgment is only based on the rate of rotational change of the turbine. However, for each of the above mentioned conditions, the amount of slip in the torque convertor increases when the frictionally engaging element starts engaging, increasing the load of the turbine. The present invention takes this characteristic into consideration and judges the completion of the invalid-stroke clearing on the basis of the amount of slip in the torque convertor, i.e., the difference between the rotational speed of the engine and that of the turbine, in addition to the rate of rotational change of the turbine. Therefore, the completion of the invalid-stroke clearing is determined accurately even if the accelerator pedal is in any of the above mentioned conditions.

In a case that the rotational speed of the engine experiences relatively small and short ups-and-downs, the rotational change of the turbine shaft lags behind the rotational change of the engine, which results in a phase shift. A wave crest of the engine rotational change may meet with a trough of the turbine rotational change at an instance, which may make the difference between the engine rotational speed and the turbine rotational speed larger. Thus, it is also inaccurate to make a judgment on the completion of the invalid-stroke clearing through a determination only based on the difference between the engine rotational speed and the turbine rotational speed. Therefore, the present invention also takes the rate of turbine rotational change into the determination, thus making an accurate judgment even in such condition.

Preferably, a high-pressure command signal for clearing invalid stroke should comprise a maximum-pressure command signal and an intermediate-pressure command signal. In response to a shift command to shift from the neutral range to the driving range, the maximum-pressure command signal is generated continuously for a predetermined time period. After this maximum-pressure command signal, the intermediate-pressure command signal is generated continuously until the absolute value of the rate of rotational change of the turbine shaft becomes equal to or greater than a predetermined rate, and the difference of the engine rotational speed and the turbine-shaft rotational speed becomes equal to or greater than a predetermined value.

In this way, an intermediate pressure is set at the completion of the invalid-stroke clearing, whereby smooth transition is made to the next control stage even if there is a lag in the transition from the completion of the invalid-stroke clearing to the next control stage.

This shift control apparatus can be applied not only to a gear.-type automatic transmission which comprises a plurality of gear trains and frictionally engaging elements and establishes a predetermined gear train selectively through actuation of a respective frictionally engaging element, but also to a continuously-variable-type automatic transmission which comprises variable-width pulleys and a V belt and, by variably changing the widths of the pulleys, controls speed change.

In the case of the gear-type automatic transmission, a squat in-gear control, which sets a starting speed range via a higher speed range, can be executed in response to a shift command to shift from the neutral range to the driving range. In this squat in-gear control, it is preferable that the invalid-stroke-clearing control for engaging the higher speed range should comprise a control stage in which a maximum-pressure command signal is generated in response to the shift command, continuously until the absolute value of the rate of rotational change of the turbine shaft becomes equal to or greater than a predetermined rate, and the difference between the engine rotational speed and the turbine-shaft rotational speed becomes equal to or greater than a predetermined value.

For such squat control, it is necessary for not only the higher speed range to be controlled for engagement but also the starting speed range to be controlled for invalid-stroke clearing. Completion of the invalid-stroke clearing for both speed ranges may be determined as mentioned above.

In this case, predetermined values applied as criteria for the absolute value of the rate of turbine-shaft rotational change and for the difference between the engine rotational speed and the turbine-shaft rotational speed for determining the completion of the invalid-stroke clearing for the higher speed range can be different from those applied for determining the completion of the invalid-stroke clearing for the starting speed range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
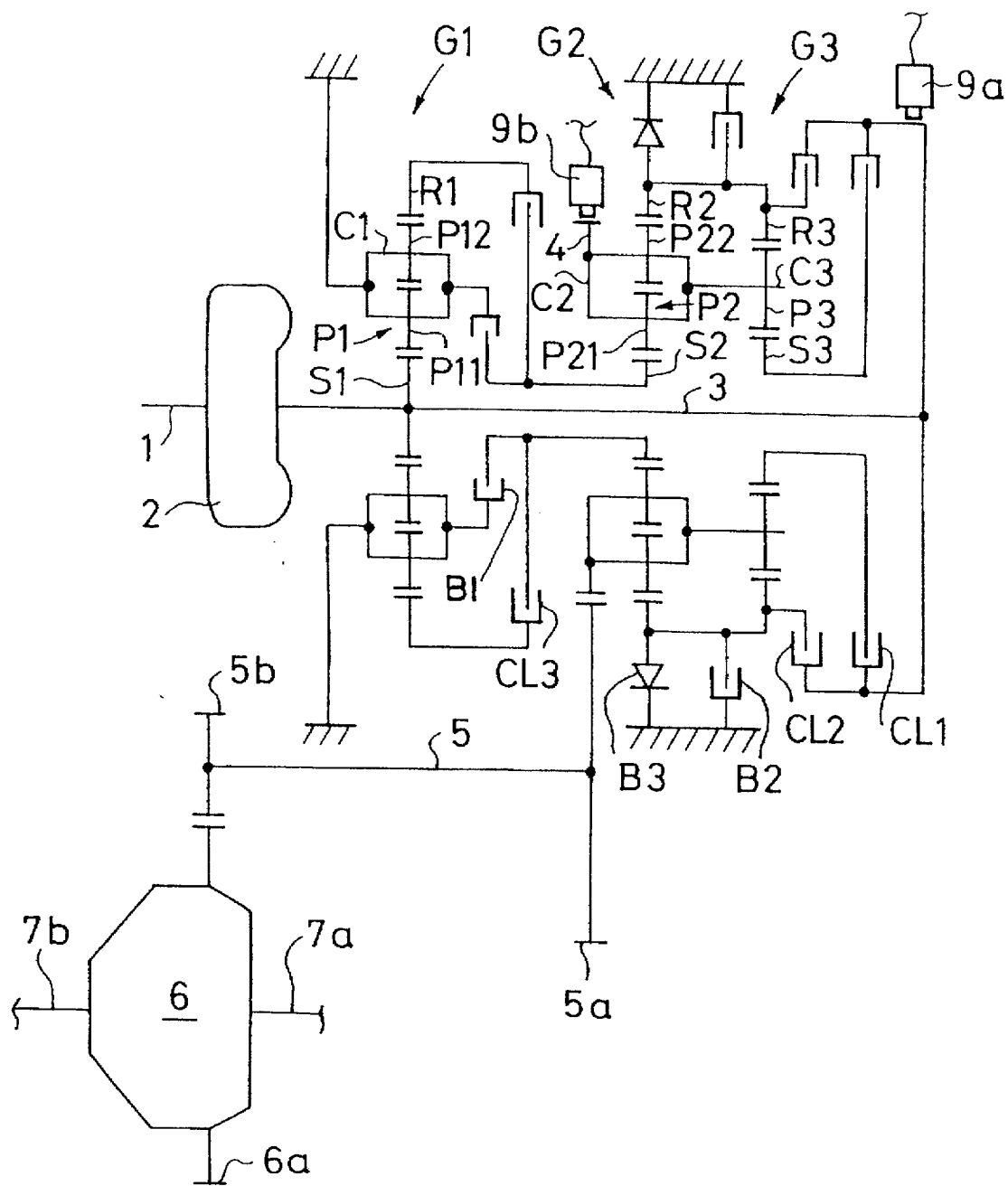
FIG. 1 is a schematic diagram of an automatic transmission which is controlled by a shift control apparatus according to the present invention.

FIG. 1 shows a power transmission system for use in an automatic transmission which is controlled by a shift control apparatus of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetarygear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which support the respective planetary pinions P1, P2 and P3 rotatably and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinions each P11 and P12, and P21 and P22, respectively.

The first sun gear S1 is connected to the input shaft 3 at all times. The first carrier C1 is fixedly retained to a housing and coupled to the second sun gear S2 through a first brake B1. Therefore, the first brake B1, when actuated, fixedly retains the second sun gear S2. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
|---|---|---|---|---|---|
| 1ST | O | | | | (O) |
| 2ND | O | | | O | |
| 3RD | O | | O | | |
| 4TH | O | O | | | |
| 5TH | | O | O | | |
| REV | | | O | | O |

Figure 2:
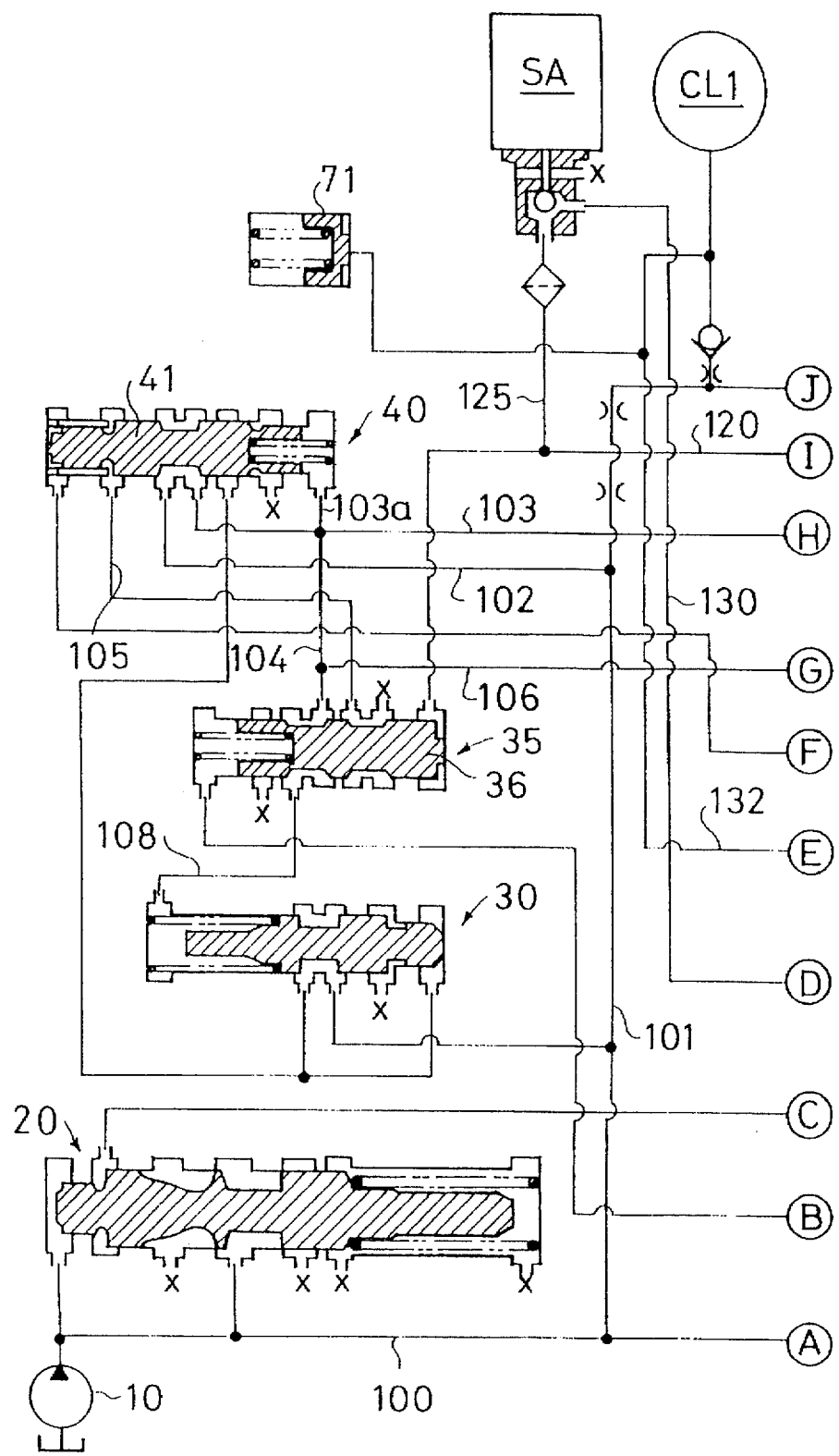
FIG. 2 is a partial hydraulic circuit diagram showing components of the shift control apparatus.
Figure 3:
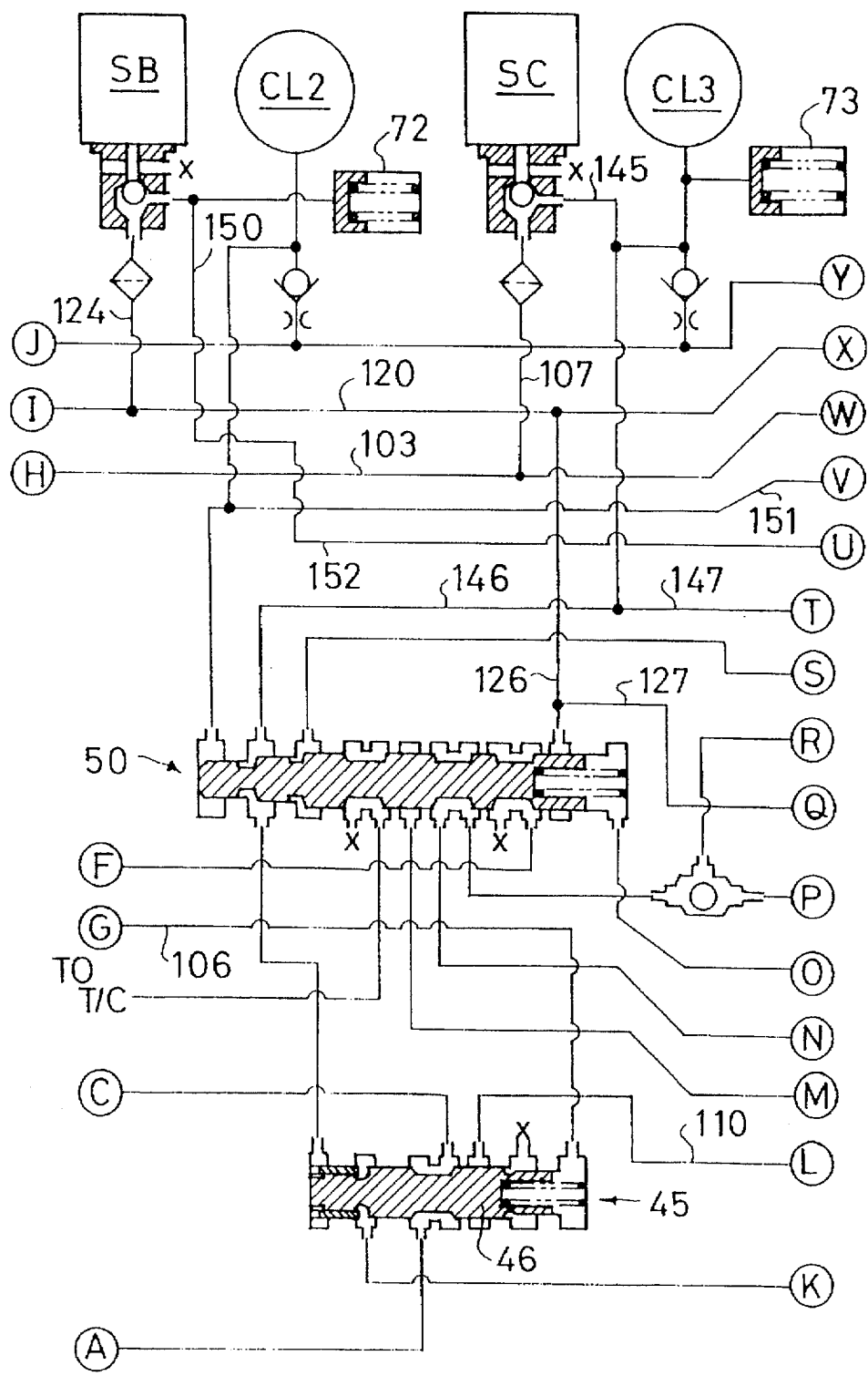
FIG. 3 is another partial hydraulic circuit diagram showing components of the shift control apparatus.
Figure 4:
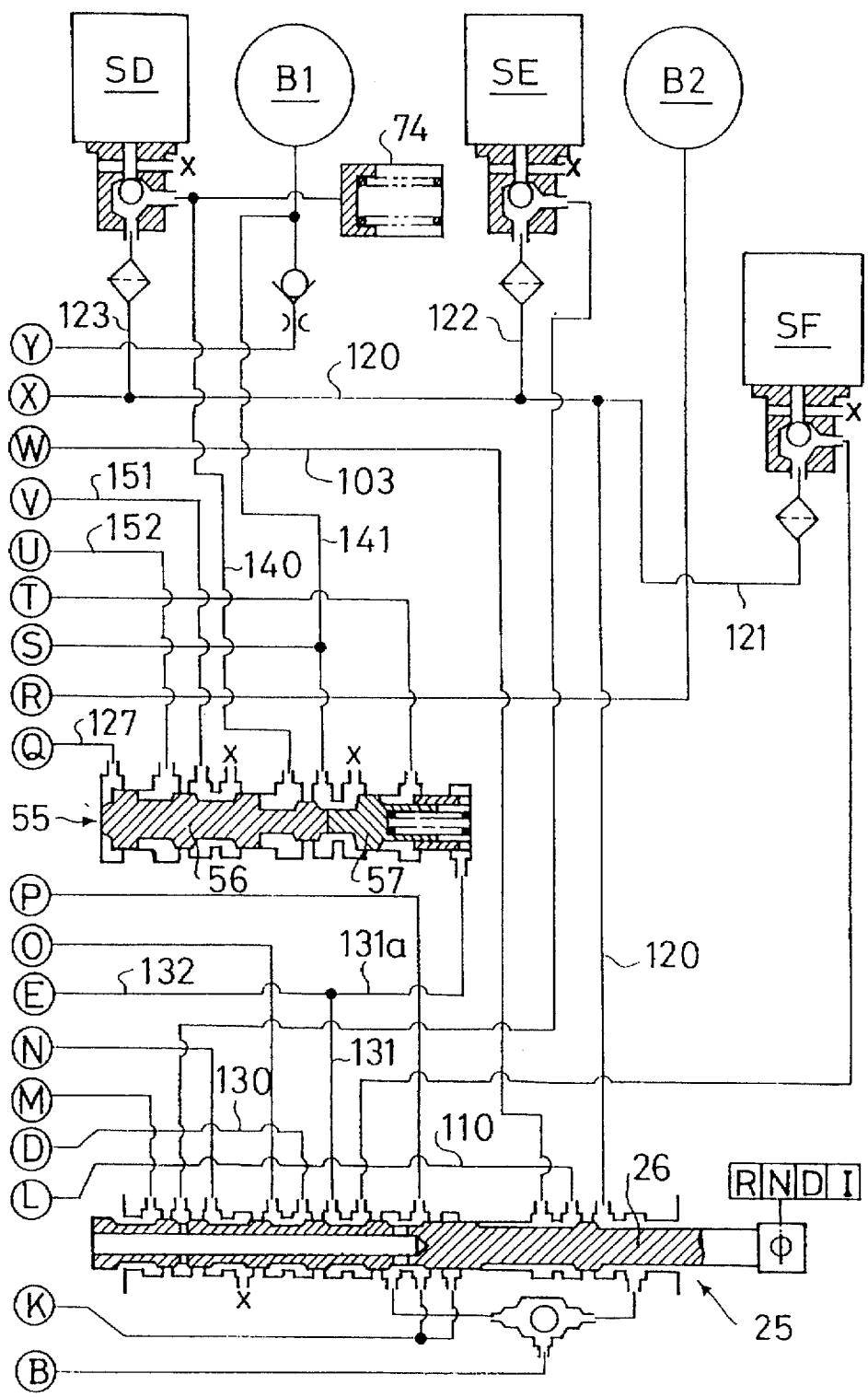
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet (A~Y) in a circle in each drawing are continuous to each other, and lines marked with "X" are connected to a drain.

This control apparatus is supplied with working oil by a hydraulic pump 10. This oil is first adjusted to a line pressure P1 by a regulator valve 20 and sent out through a line 100 as shown in the figures.

Besides this regulator valve 20, the control apparatus has a manual valve; 25; six solenoid valves SA~SF; six hydraulic valves 30, 35, 40, 45, 50 and 55; and four accumulators 71, 72, 73 and 74. The manual valve 25 is connected to a shift lever at the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA~SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but used only for increasing the line pressure when the reverse speed range is established.

TABLE 2

| Speed ranges | SOLENOID-OPERATED VALVE | | | | |
|---|---|---|---|---|---|
| | SA | SB | SC | SD | SE |
| Type | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/C: Lockup clutch.

At first, description is given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a fine 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto.

In the above described ways, the line pressure P1 is supplied to each of the solenoid valves SA~SF, which are controlled to open or close for the purpose of controlling supply of the line pressure P1.

First, establishing the 1ST speed range is described. As the solenoid valve SF is not involved in establishing a forward range, only the solenoid valves SA~SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25. A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief valve 55 and the solenoid valve SD. The second brake B2 is connected to the drain through the manual valve 25. Therefore, only the first clutch CL1 engages to establish the 1ST speed range.

Next, description is made of establishing the 2ND speed range. The solenoid valve SD, which was off for establishing the 1ST speed range, is turned on to open. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is switched from on to off, and the solenoid valve SD is returned to off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is switched from off to on, and the solenoid valve SC is also turned on. As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC opens, the third clutch CL3 engages as described previously. As a result, the 5TH speed range is established.

Figure 6:
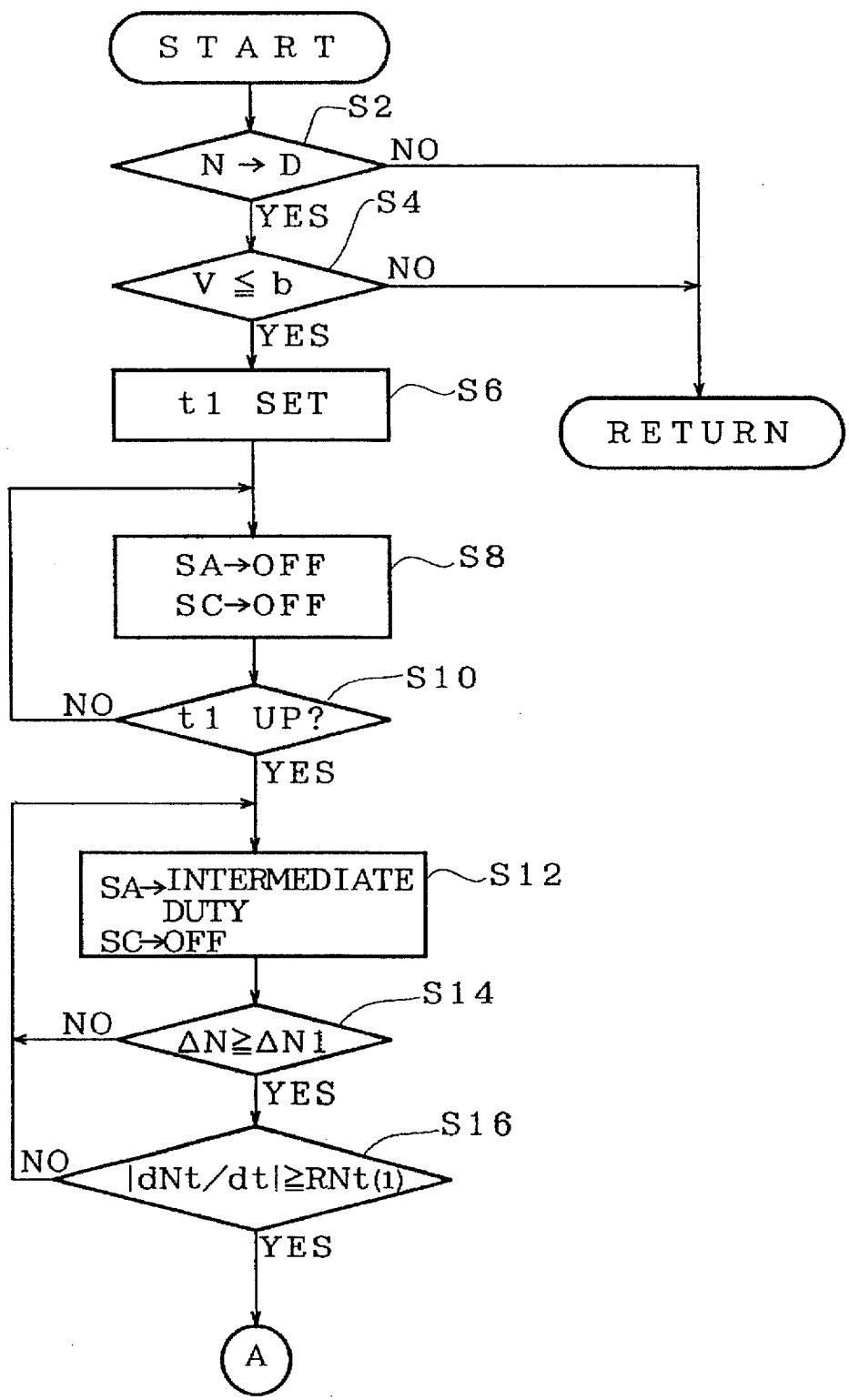
FIG. 6 is a flowchart showing processes effected by the shift control apparatus.
Figure 7:
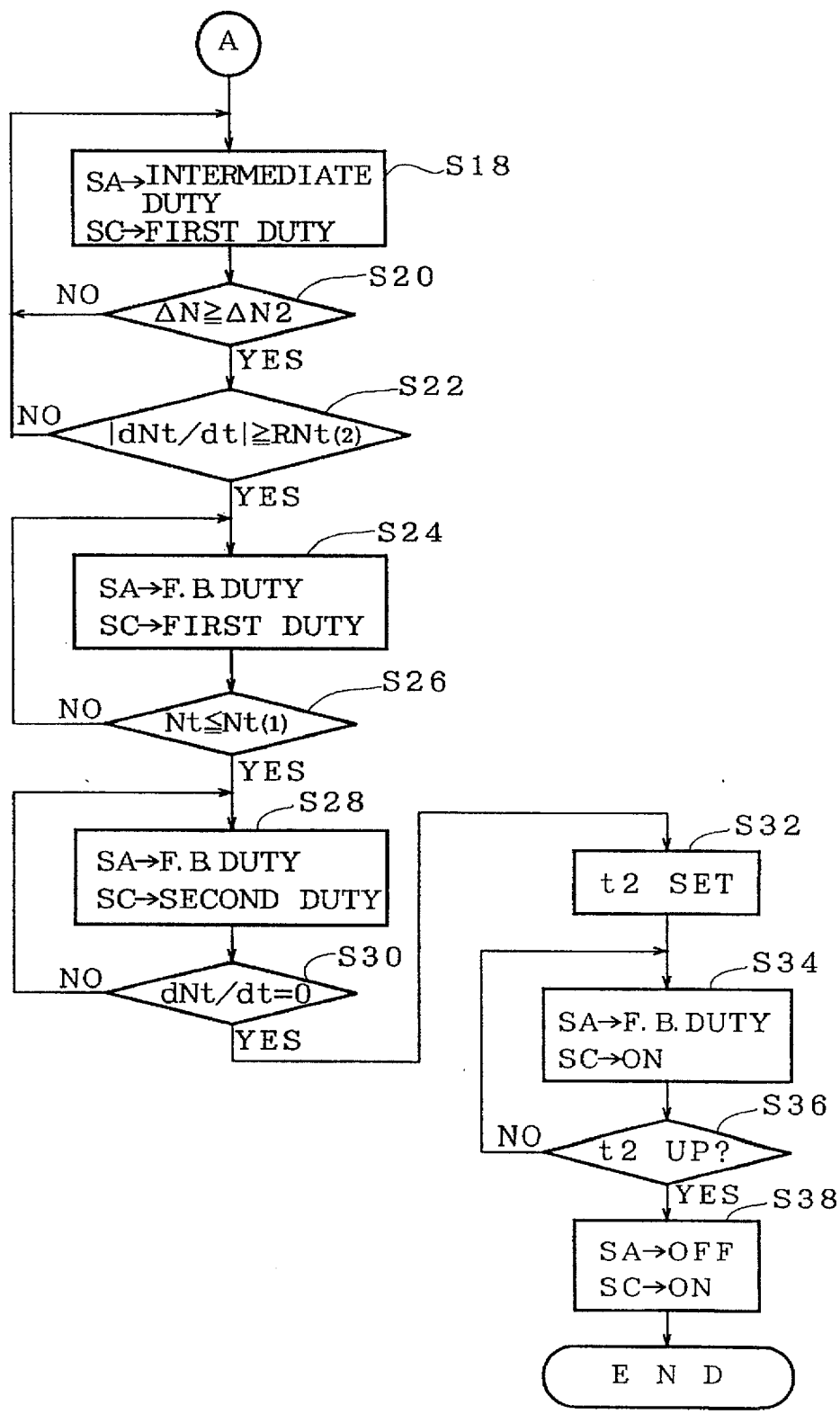
FIG. 7 is another flowchart showing processes effected by the shift control apparatus.

The clutches and brakes are controlled for engagement and disengagement in the manner described above. Now, an engagement control is described for a shift from the N range (neutral range) to the D range (forward range) which is carried out when the shift lever is operated from position N to position D, with reference to a timing chart in FIG. 5 and a flowchart in FIGS. 6 and 7.

As shown in the flowchart, this shift of the shift lever from N to D is detected by the shift control apparatus at step S2. Here, if the shift is not to the D range, then the following control is not executed. After the detection of the shift to the D range at step S2, determination is made whether the vehicle speed V is smaller than a predetermined speed b (value approximately zero) or not, i.e., whether the vehicle is substantially halted or not at step S4. If the vehicle speed V is not approximately zero, then the following control is not executed either.

Figure 5:
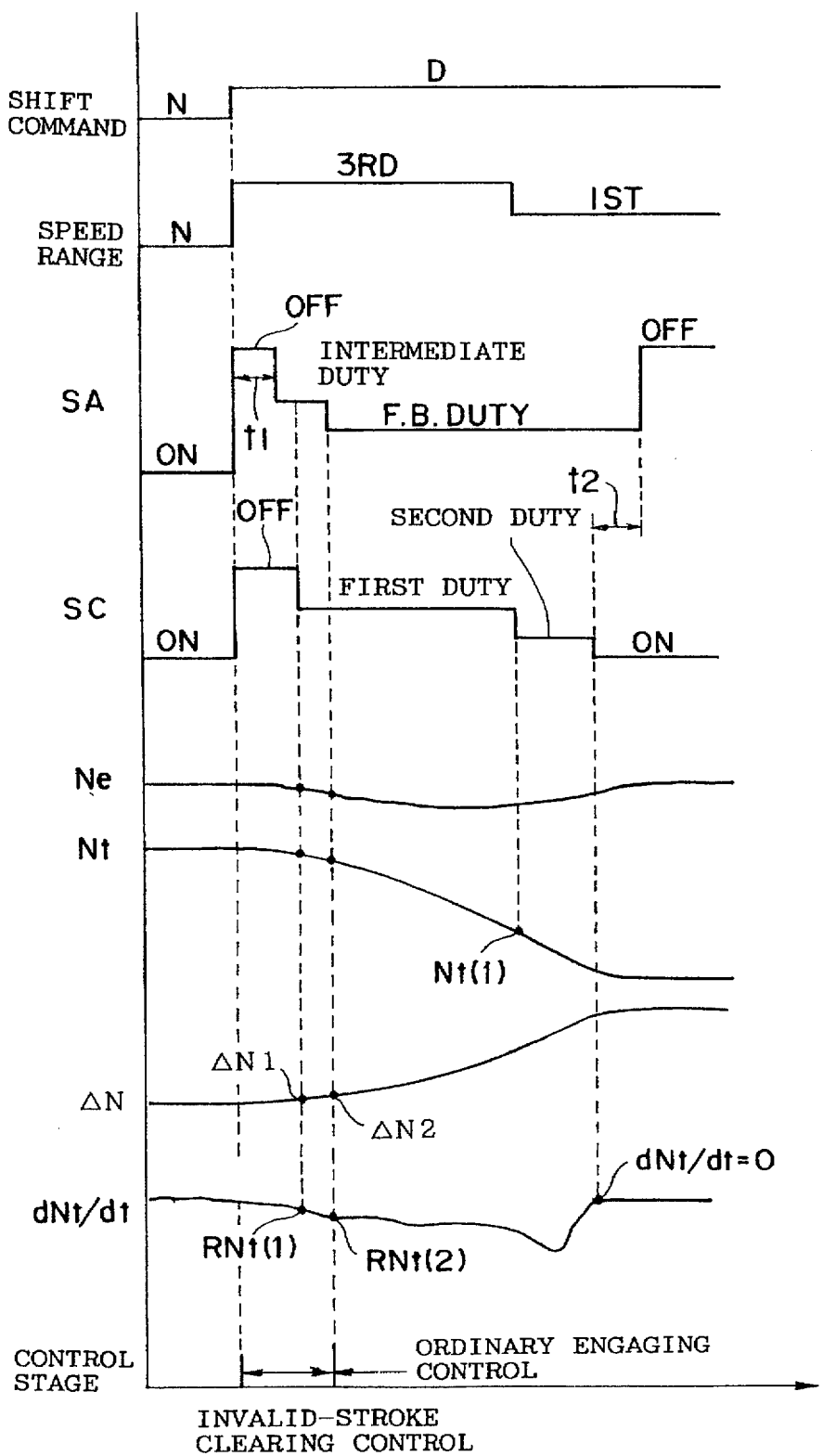
FIG. 5 is a chart showing actuation conditions of solenoid valves and chronological changes of various parameters during a shift control which is carried by the shift control apparatus.

If the shift lever is shifted from N to D while the vehicle speed V is approximately zero, then the control flow proceeds to step S6 to start a first timer t1. As shown in FIG. 5, the solenoid valve SA and SC are turned off at step S8, and this condition is kept until a time set in the first timer t1 at step S6 elapses (step S10).

The solenoid valves SA and SC, both of which are normally open type, are kept open so that oil is supplied rapidly to the first and third clutches CL1 and CL3, shifting the pistons of the clutches to eliminate their invalid strokes. This invalid-stroke-clearing control or process is executed quickly as each piston chamber of the clutches is being filled with oil.

After the elapse of the time set in the first timer t1, the control flow proceeds from step S10 to step S12. While the solenoid valve SC is kept turned off, the solenoid valve SA is actuated at an intermediate duty cycle to generate a pressure which is required for the clutch to remain in a preengagement condition. Thus, the supply of oil to the first clutch CL1 is constricted while the supply of oil to the third clutch CL3 is continued at the same rapid rate.

In this control, the engine rotational speed Ne, the turbine rotational speed Nt of the torque convertor and the rate of turbine rotational change dNt/dt are detected, and the difference ΔN (=Ne–Nt) between the engine rotational speed Ne and the turbine rotational speed Nt is calculated. If this difference ΔN is determined greater than a first allowable difference ΔN1 and the absolute; value of the rate of turbine rotational change dNt/dt is determined greater than a first allowable rate RNt(1) at steps S14 and S16, then the invalid-stroke clearing of the third clutch CL3 is judged complete, and the control flow proceeds to a process for actuating the solenoid valve SC at a first duty cycle while the solenoid valve SA is kept actuated at the intermediate duty cycle at step S18. The first duty cycle is slightly greater than the intermediate duty cycle and allows generation of a pressure high enough to make the third clutch CL3 engage with a certain amount. Thereby, the third clutch CL3 is kept in a predetermined engagement condition (loosely engaging condition) to establish the 3RD speed range.

Thereafter, if the difference ΔN between the engine rotational speed Ne and the turbine rotational speed Nt is determined greater than a second allowable difference ΔN2 (ΔN2>ΔN1) and the absolute value of the rate of turbine rotational change dNt/dt is determined greater than a second allowable rate RNt(2) (IRNt(2)I >IRNt(1)I) at steps S20 and S22, then the invalid-stroke clearing of the first clutch CL1 is judged complete. The control flow proceeds to step S24 for executing a feedback duty-cycle control of the solenoid valve SA while the solenoid valve SC is kept actuated at the first duty cycle. This feedback duty-cycle control is a feedback control with the turbine rotational speed Nt and the rate of turbine rotational change dNt/dt set as target values.

This feedback control is a control which gradually engages the first clutch CL1. Therefore, when the control flow proceeds to step S24, the invalid-stroke-clearing control is succeeded by an ordinary engaging control.

Then, if the turbine rotational speed Nt decreases to a predetermined rotation Nt(1), then the control flow proceeds from step S26 to step S28. The solenoid valve SC is actuated at a second duty cycle while the solenoid valve SA is kept actuated by the feedback duty-cycle control. This second duty cycle; is to further reduce the actuation pressure P(CL3) of the third clutch CL3, whereby the third clutch CL3 is gradually released for the transmission to shift to the 1ST speed range.

When the rate of turbine rotational change dNt/dt becomes almost zero, the control flow proceeds from step S30 to step S32 to start a second timer t2. The solenoid valve SC is turned on at step S34 to release the third clutch CL3 completely. The second timer is set for the purpose of providing a waiting time for the first clutch CL1 to engage completely. When the time set in the second timer t2 elapses, the control flow proceeds from step S36 to step S38. While the solenoid valve SC is kept turned on, the solenoid valve SA is turned off to maximize the actuation pressure of the first clutch CL1 so that the first clutch CL1 engages completely. Even though the actuation pressure is made maximum, there is no shift shock.

As described above, the in-gear squat control is carried out smoothly.

In the control described in FIG. 5, the solenoid valve SC may be actuated by the first duty-cycle control after the absolute value of the rate of turbine rotational change dNt/dt becomes greater than a predetermined allowable RNt(s), and the intermediate duty-cycle control of the solenoid valve SA may be followed by the feedback duty-cycle control when the difference ΔN between the engine rotational speed Ne and the turbine rotational speed Nt becomes greater than a predetermined allowable difference ΔNs. In this case, the invalid-stroke-clearing control is followed by the ordinary engaging control when the absolute value of the rate of turbine rotational change dNt/dt becomes greater than the predetermined allowable rate RNt(s) and the difference ΔN becomes greater than the predetermined allowable difference ΔNs.

In the above embodiment, an in-gear squat control which sets the starting speed range (1ST speed range) via a higher speed range (3RD speed range) is described as an example. However, the present invention is not limited to this. The apparatus of the present invention can also be applied to a shift control in which the starting speed range is directly set from the neutral range.

Figure 8:
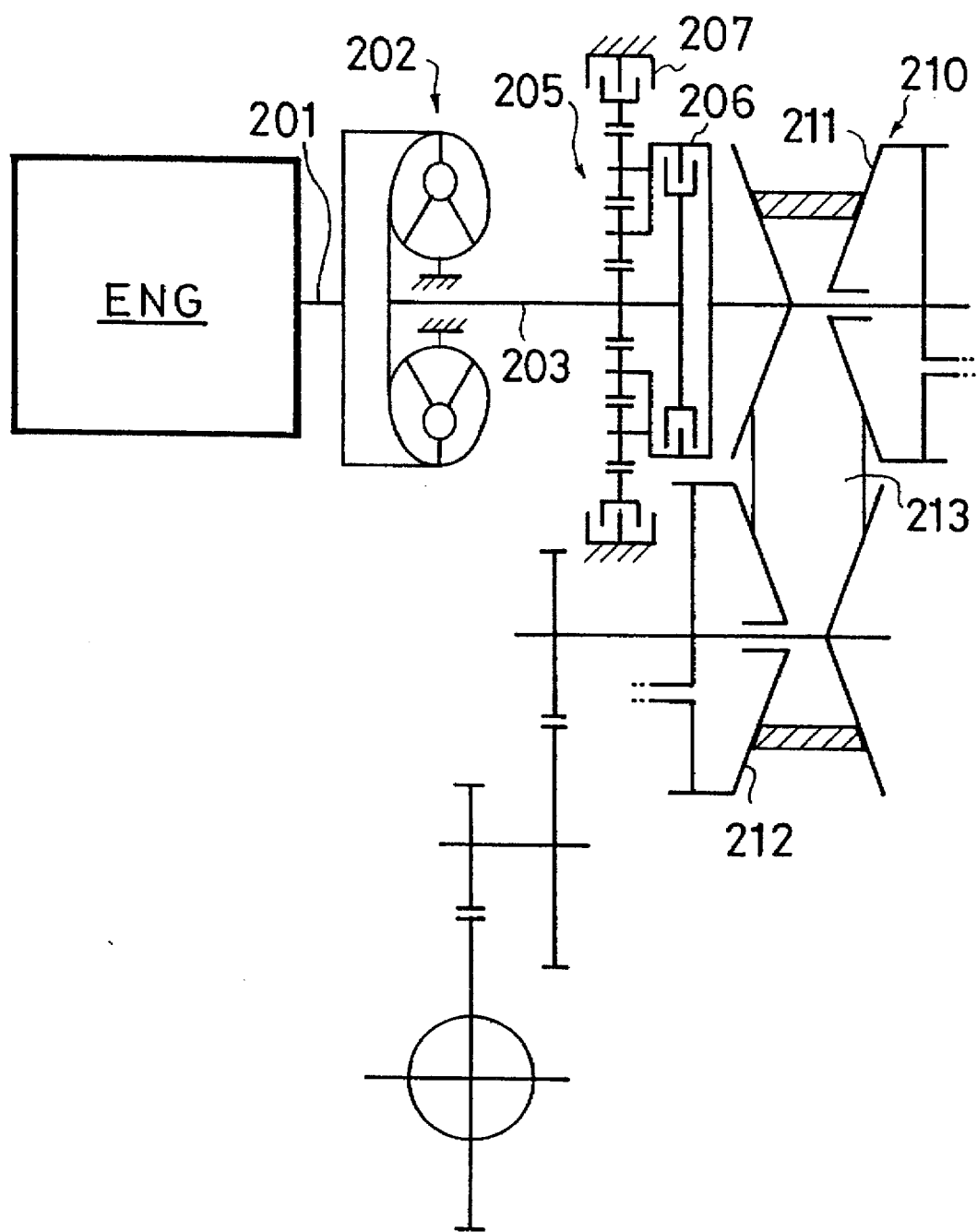
FIG. 8 is a schematic view of another automatic transmission, which is controlled by the shift control apparatus according to the present invention.

In the above embodiment, a gear-type automatic transmission has been described comprising a plurality of planetary gears constituting a plurality of power transmission paths, and automatic shifting is carried out through selective actuation of frictionally engaging elements such as clutches and brakes. However, the control apparatus according to the present invention can be applied not only to such gear-type automatic transmission but also to a continuously-variable-type automatic transmission such as shown in FIGS. 8 and 9.

The following are brief descriptions of continuously-variable-type automatic transmissions. The automatic transmission shown in FIG. 8 comprises a torque convertor 202 coupled to an output shaft 201 of an engine ENG, a forward/reverse-switching mechanism 205 including a double-pinion planetary gear coupled to an output shaft of the torque convertor 202, and a continuously variable speed mechanism 210 connected with the forward/reverse-switching mechanism 205. The forward/reverse-switching mechanism 205, which is connected to a turbine shaft 203 of the torque convertor 202, includes a forward clutch 206 and a reverse brake 207. This forward clutch 206 is engaged to establish a forward range (selecting a forward power transmission path), and the reverse brake 207 is engaged to establish a reverse range (selecting a reverse power transmission path). When both of them are released, a neutral range is established.

The continuously variable speed mechanism 210 comprises a drive pulley 211 and a driven pulley 212, each width of which is variably adjustable, and a metallic V-belt mechanism 213 disposed between the pulleys 211 and 212. Such that, when the widths of the pulleys are variably adjusted, the speed ratio is continuously varied.

Figure 9:
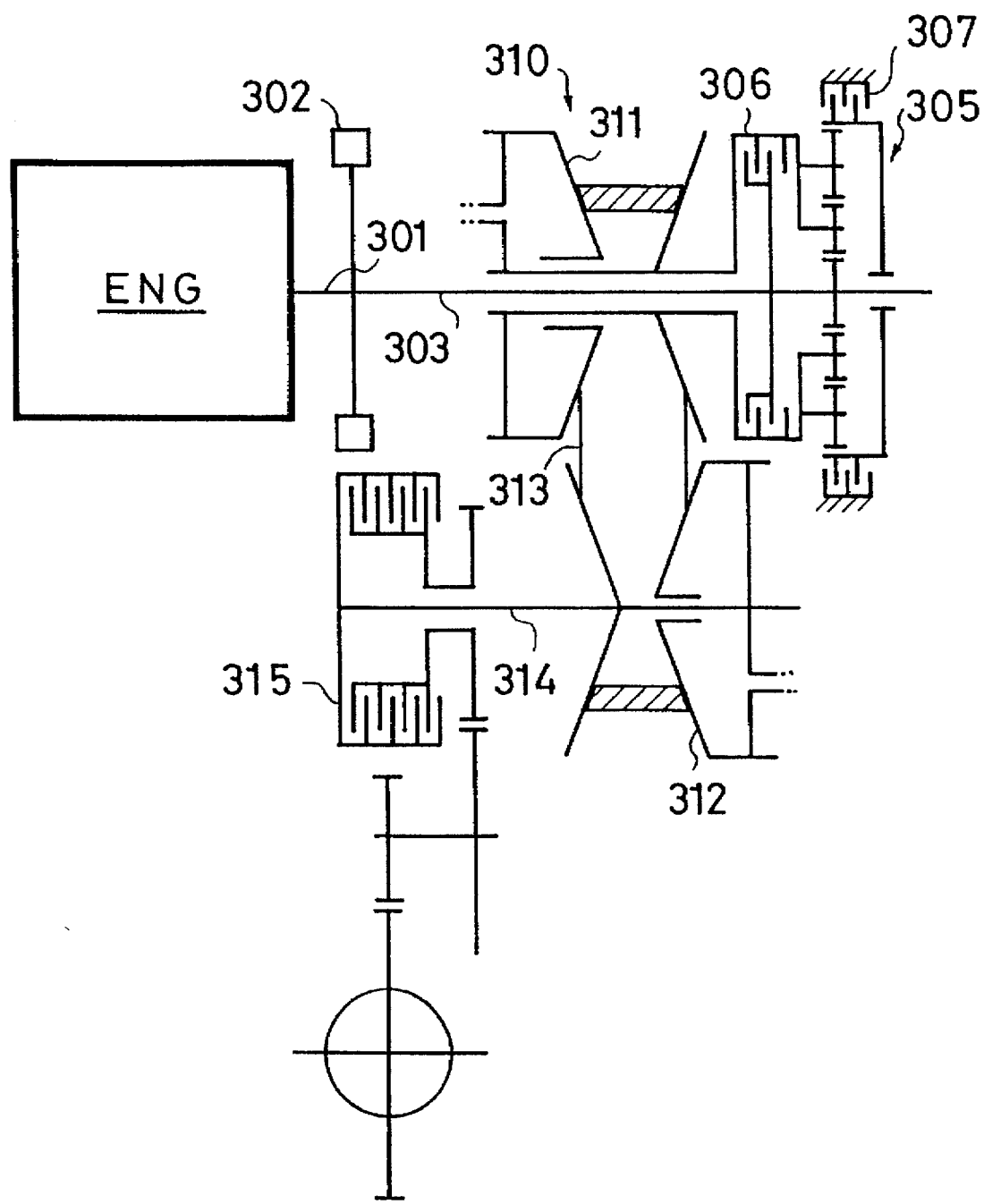
FIG. 9 is a schematic view of yet another automatic transmission, which is controlled by the shift control apparatus according to the present invention.

In the automatic transmission shown in FIG. 9, a transmission input shaft 303 is connected with an output shaft 201 of an engine ENG through a coupling 302 and to a forward/reverse-switching mechanism 305 similar to the one described above. This forward/reverse-switching mechanism 305 is then connected with a continuously variable speed mechanism 310, whose output shaft 314 is connected to a starting clutch 315.

In this transmission, a forward clutch 306 is engaged to establish a forward range (selecting a forward power transmission path), a reverse brake 307 is engaged to establish a reverse range (selecting a reverse power transmission path), and the starting clutch 315 is released to establish a neutral range.

Figure 10:
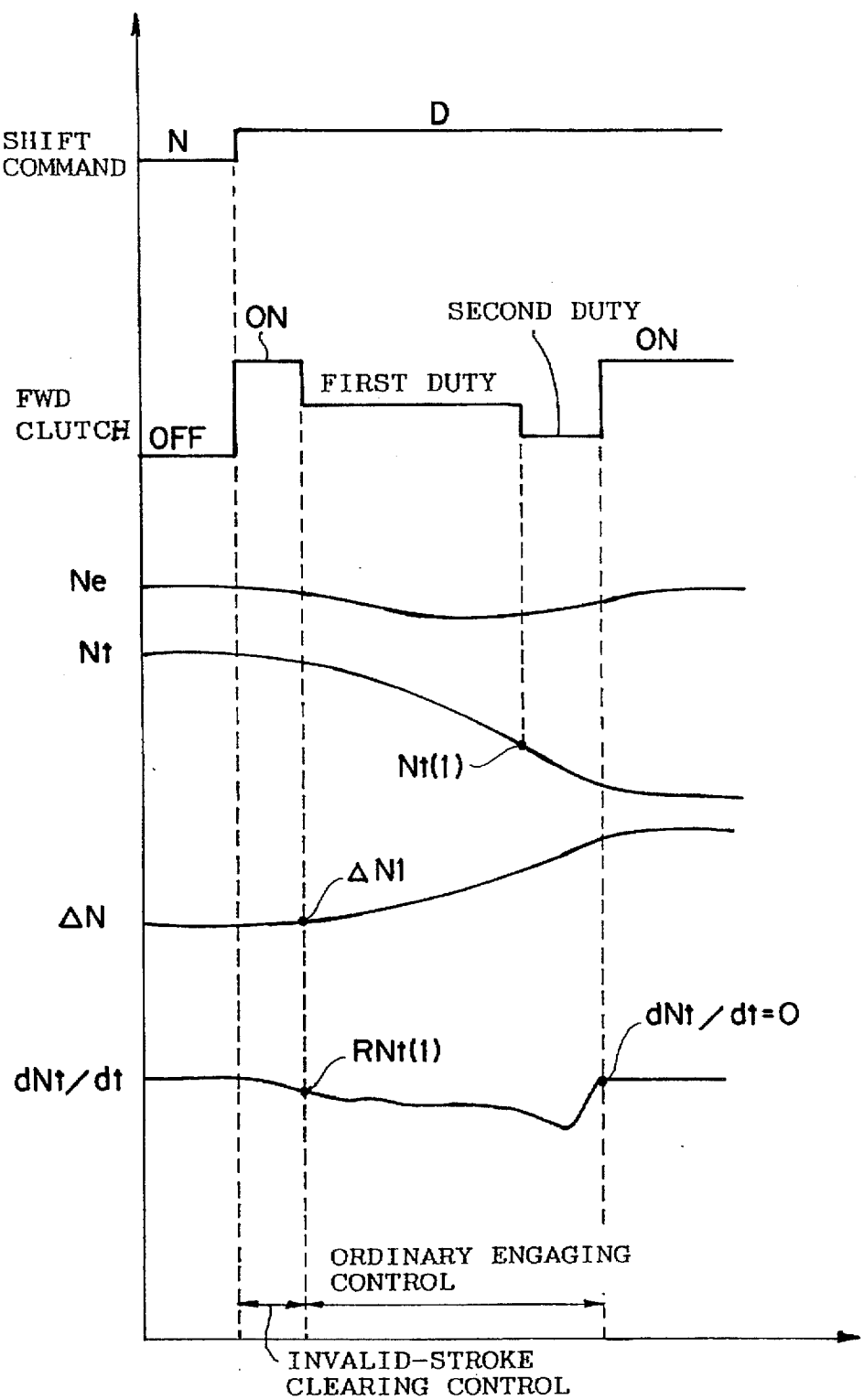
FIG. 10 is a chart showing actuation conditions of solenoid valves and chronological changes of various parameters during a shift control which is carried by the shift control apparatus according to another embodiment.

In these automatic transmissions of continuously variable type, the shift from the neutral range to the driving range (forward range or reverse range) can be controlled in the same manner as in the previous embodiment. One typical embodiment for controlling the engagement of the forward clutch 306 is shown in the time-chart of FIG. 10.

Further, in the transmission of FIG. 8, a starting clutch which is similar to the clutch 315 can be provided on the output shaft of the driven pulley 212.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 7-101782 filed on Apr. 3, 1995, which is incorporated herein by reference.

What is claimed is:

1. A shift control apparatus for an automatic transmission comprising:

a torque convertor coupled to an output shaft of an engine, a plurality of power transmission paths provided between a turbine shaft of said torque convertor and a transmission output member, a plurality of frictionally engaging elements for selectively establishing a predetermined power transmission path among said power transmission paths, and engagement-controlling means for controlling engagement-actuation of said frictionally engaging elements;

wherein:

said transmission is capable of establishing at least a neutral range and a driving range;

said engagement-controlling means carries out an engagement-actuation control by controlling actuation pressures of said frictionally engaging elements in correspondence with pressure command signals;

said engagement-actuation control for the frictionally engaging element to establish said driving range in response to a shift command to shift from said neutral range to said driving range comprises a plurality of control stages in which an invalid-stroke-clearing control is included; and said invalid-stroke-clearing control finishes when invalid-stroke clearing is judged complete on a basis that an absolute value of a rate of rotational change, of said turbine shaft is equal to or greater than a predetermined rate and that a difference between a rotational speed of said engine and a rotational speed of said turbine shaft is equal to or greater than a predetermined value.

2. The shift control apparatus as set forth in claim 1 wherein:

the engagement-actuation control of the frictionally engaging element for said driving range is started upon completion of said invalid-stroke-clearing control.

3. The shift control apparatus as set forth in claim 1 wherein:

said automatic transmission is mounted in a motor vehicle; and while said motor vehicle is substantially halted with a driving speed of approximately zero, said invalid-stroke-clearing control is executed in response to said shift command.

4. The shift control apparatus as set forth in claim 1 wherein:

said invalid-stroke clearing control comprises:

a maximum-pressure command control which is executed continuously for a predetermined time period in response to said shift command, and an intermediate-pressure command control which is executed after said maximum-pressure command control and continued until the absolute value of said rate becomes equal to or greater than the predetermined rate and said difference becomes equal to or greater than the predetermined value.

5. The shift control apparatus as set forth in claim 4 wherein:

said maximum-pressure command control includes generation of a pressure command signal to maximize the actuation-pressure of the frictionally engaging element for establishing said driving range; and said intermediate-pressure command control includes generation of a pressure command signal to set the actuation-pressure of the frictionally engaging element for establishing said driving range to a predetermined intermediate pressure.

6. The shift control apparatus as set forth in claim 5 wherein:

said predetermined intermediate pressure is a pressure necessary for said frictionally engaging element to be kept in a preengagement condition.

7. The shift control apparatus as set forth in claim 1 wherein:

said automatic transmission is a gear-type automatic transmission which comprises a plurality of gear trains to constitute said power transmission paths.

8. The shift control apparatus as set forth in claim 1 wherein:

said automatic transmission is a continuously-variable-type automatic transmission which comprises a continuously variable speed mechanism capable of adjusting a speed ratio continuously variably and a forward/reverse-switching mechanism capable of alternatively establishing a forward range, a neutral range and a reverse range; and said continuously variable speed mechanism and said forward/reverse-switching mechanism constitute said power transmission paths.

9. The shift control apparatus as set forth in claim 1, further comprising:

a shift control for establishing a starting speed range via a higher speed range in response to said shift command, wherein:

the engagement-actuation control for said higher speed range carried out by said engagement-controlling means includes said invalid-stroke-clearing control of the frictionally engaging element for establishing said higher speed range in which a high-pressure command signal is generated in response to said shift command and continued being generated until the absolute value of said rate becomes equal to or greater than the predetermined rate and said difference becomes equal to or greater than the predetermined value.

10. The shift control apparatus as set forth in claim 1, further comprising:

a shift control for establishing a starting speed range via a higher speed range in response to said shift command, wherein:

the engagement-actuation control for said higher speed range carried out by said engagement-controlling means includes said invalid-stroke-clearing control of the frictionally engaging element for establishing said higher speed range in which a maximum-pressure command signal is generated in response to said shift command and continued being generated until the absolute value of said rate becomes equal to or greater than a first predetermined rate and said difference becomes equal to or greater than a first predetermined value; and the engagement-actuation control for said starting speed range carried out by said engagement-controlling means includes the invalid-stroke-clearing control of the frictionally engaging element for establishing said starting speed range; said invalid-stroke-clearing control comprising two control stages: a first starting-speed-range control including generation of a maximum-pressure command signal initiated in response to said shift command and continued for a predetermined time period and a second starting-speed-range control, executed following said first starting-speed-range control, including generation of an intermediate-pressure command signal continued until the absolute value of said rate becomes equal to or greater than a second predetermined rate and said difference becomes equal to or greater than a second predetermined value.

11. The shift control apparatus as set forth in claim 10 wherein:

said automatic transmission is mounted in a motor vehicle; and while said motor vehicle is substantially halted with a driving speed of approximately zero, said invalid-stroke-clearing control is executed in response to said shift command.

12. The shift control apparatus as set forth in claim 10 wherein:

said intermediate-pressure command signal generated in said second starting-speed-range control is a signal to set a pressure necessary for said frictionally engaging element to be kept in a preengagement condition.

13. The shift control apparatus as set forth in claim 10 wherein:

when the absolute value of said rate becomes equal to or greater than said first predetermined rate and said difference becomes equal to or greater than said first predetermined value, the invalid-stroke-clearing control of the frictionally engaging element for said higher speed range is finished and a control for loosely engaging the frictionally engaging element for said higher speed range is executed in the engagement-actuation control for said higher speed range.

14. The shift control apparatus as set forth in claim 10 wherein:

when the absolute value of said rate becomes equal to or greater than said second predetermined rate and said difference becomes equal to or greater than said second predetermined value, the invalid-stroke-clearing control of the frictionally engaging element for said starting speed range is finished and a control for engaging the frictionally engaging element for said starting speed range is executed in the engagement-actuation control for said starting speed range.

15. The shift control apparatus as set forth in claim 9 wherein:

said automatic transmission is a gear-type automatic transmission which comprises a plurality of gear trains to constitute said power transmission paths.

16. A shift control apparatus for an automatic transmission comprising:

a plurality of power transmission paths provided between a transmission input member coupled to an output shaft of an engine and a transmission output member, a plurality of frictionally engaging elements for selectively establishing a predetermined power transmission path among said power transmission paths, and engagement-controlling means for controlling engagement-actuation of said frictionally engaging elements;

wherein:

said transmission is capable of establishing at least a neutral range and a driving range;

said engagement-controlling means carries out an engagement-actuation control by controlling actuation pressures of said frictionally engaging elements in correspondence with pressure command signals;

said engagement-actuation control for the frictionally engaging element to establish said driving range in response to a shift command to shift from said neutral range to said driving range comprises a plurality of control stages in which an invalid-stroke-clearing control is included; and said invalid-stroke-clearing control finishes when invalid-stroke clearing is judged complete on a basis that an absolute value of a rate of rotational change of said transmission input member is equal to or greater than a predetermined rate and that a difference between a rotational speed of said engine and a rotational speed of said transmission input member is equal to or greater than a predetermined value.

17. The shift control apparatus as set forth in claim 16 wherein:

the engagement-actuation control of the frictionally engaging element for said driving range is started upon completion of said invalid-stroke-clearing control.

18. The shift control apparatus as set forth in claim 16 wherein:

said automatic transmission is mounted in a motor vehicle; and while said motor vehicle is substantially halted with a driving speed of approximately zero, said invalid-stroke-clearing control is executed in response to said shift command.

19. The shift control apparatus as set forth in claim 16 wherein:

said invalid-stroke clearing control comprises:

a maximum-pressure command control which is executed continuously for a predetermined time period in response to said shift command, and an intermediate-pressure command control which is executed after said maximum-pressure command control and continued until the absolute value of said rate becomes equal to or greater than the predetermined rate and said difference becomes equal to or greater than the predetermined value.

20. The shift control apparatus as set forth in claim 19 wherein:

said maximum-pressure command control includes generation of a pressure command signal to maximize the actuation-pressure of the frictionally engaging element for establishing said driving range; and said intermediate-pressure command control includes generation of a pressure command signal to set the actuation-pressure of the frictionally engaging element for establishing said driving range to a predetermined intermediate pressure.

21. The shift control apparatus as set forth in claim 20 wherein:

said predetermined intermediate pressure is a pressure necessary for said frictionally engaging element to be kept in a preengagement condition.

22. The shift control apparatus as set forth in claim 16 wherein:

said automatic transmission is a gear-type automatic transmission which comprises a plurality of gear trains to constitute said power transmission paths.

23. The shift control apparatus as set forth in claim 16 wherein:

said automatic transmission is a continuously-variable-type automatic transmission which comprises a continuously variable speed mechanism capable of adjusting a speed ratio continuously variably and a forward/reverse-switching mechanism capable of alternatively establishing a forward range, a neutral range and a reverse range; and said continuously variable speed mechanism and said forward/reverse-switching mechanism constitute said power transmission paths.

\* \* \* \* \*